United States Patent [19]

Tadauchi et al.

[11] 4,420,742

[45] Dec. 13, 1983

[54] SCAN SIGNAL PROCESSING SYSTEM

[75] Inventors: Masaharu Tadauchi, Hitachi; Kiyohiko Tanno, Katsuta; Taizoh Nakano, Tokyo, all of Japan

[73] Assignees: Hitachi, Ltd.; Nippon Telegraph & Telephone Public Corporation, both of Tokyo, Japan

[21] Appl. No.: 260,090

[22] Filed: May 4, 1981

[30] Foreign Application Priority Data

May 9, 1980 [JP] Japan .................................. 55-60565
May 9, 1980 [JP] Japan .................................. 55-60566

[51] Int. Cl.³ ........................................... H03K 13/00
[52] U.S. Cl. ................................ 340/347 AD; 382/50
[58] Field of Search ............. 340/347 AD, 146.3 AG; 358/280, 282, 284; 364/515

[56] References Cited

U.S. PATENT DOCUMENTS 3,599,151 8/1971 Harr .......................... 340/146.3 AG
4,128,830 12/1978 Weythman .......................... 358/282

Primary Examiner—C. D. Miller
Attorney, Agent, or Firm—Antonelli, Terry & Wands

[57] ABSTRACT

An analog scan signal having a repetitive background waveform is converted into a multi-level signal through a peek hold circuit, a converter, a digital memory and a discriminator. The peak hold circuit detects and holds the peak voltage of the current scan lines. The background waveform is normalized by the peak voltage and converted into a digital signal in the converter and stored in the memory. The analog scan signal is discriminated in the discriminator on the basis of a reference voltage produced with the normalized background waveform read out of the memory and converted in the converter and with the current peak voltage supplied from the peak hold circuit.

15 Claims, 11 Drawing Figures

F I G. 10
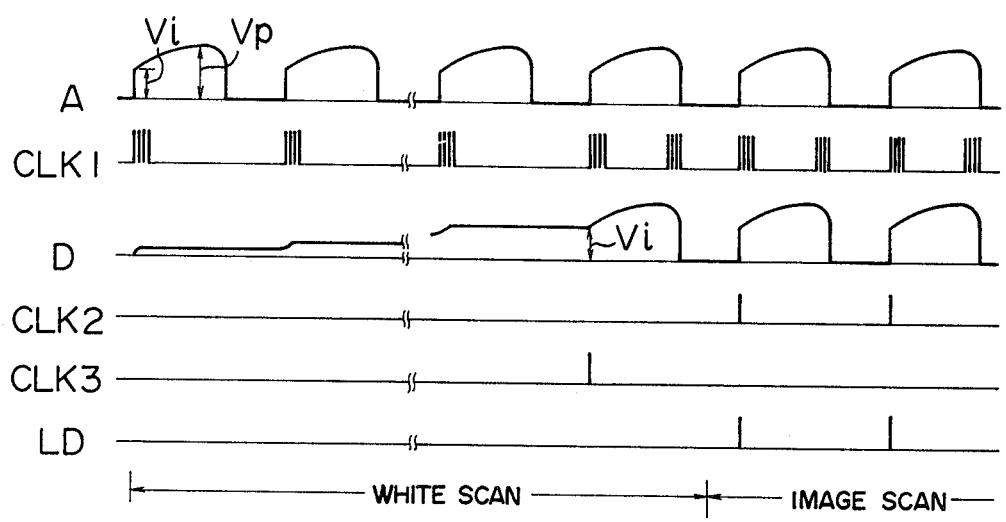
F I G. 11
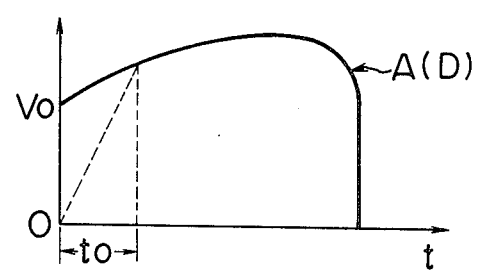

SCAN SIGNAL PROCESSING SYSTEM

CROSS REFERENCE TO RELATED APPLICATIONS

This application relates to subject matter described in Japanese Patent Application No. 54-63842 filed on May 25, 1979 by Hitachi Ltd., and invented by Masaharu Tadauchi (corresponding to U.S. Patent application Ser. No. 151,982 filed on May 21, 1980 now abandoned) and Japanese Patent Application No. 55-60571 filed on May 9, 1980 by Hitachi Ltd. and invented by Masaharu Tadauchi and Kenji Kumasaka (corresponding to U.S. Patent Application Ser. No. 260,122 now U.S. Pat. No. 4,367,457).

BACKGROUND OF THE INVENTION

1. Field of the Invention

The present invention relates to a scanning signal processing system, and more particularly to an analog scanning signal processing system for converting an analog scanning signal having a substantially constant shading profile to a multi-level signal.

2. Description of the Prior Art

When an analog signal is converted to a multi-level of multi-state signal such as bi-level or tri-level signal, the analog signal voltage is compared with a reference voltage or reference voltages to produce the multi-level signal. The conversion precision depends on the precisions of the analog voltage and the reference voltage.

In a facsimile or an optical character reader (OCR), optical information such as characters on a document sheet is scanned by photo-electric converter means to produce an analog video signal, which is then converted to a multi-level video signal. The analog video signal may be produced by superimposing the information signal on a background representing a plain paper. When the optical information representing the darkness or brightness on the document sheet is converted to a bi-level video signal, the conversion precision depends on a distribution of illumination on the document sheet and image forming conditions of an optical system including lenses. When a line sensor is used, the conversion precision further depends on a distribution of sensitivity of sensor elements of the line sensor. Thus, while the document sheet is plane (e.g uniformly white), the scanned analog video signal (referred to as a white scan signal train) may not have a constant voltage level but have a specific profile. This profile is reproduced in each scan with a substantially same pattern. Such a characteristic distribution of the analog video scan signal representing background (state of no information) is called shading. A general or relative characteristic distribution is called a shading profile, and a characteristic distribution including voltage level is called a shading characteristic, in this specification. When the analog information signal containing the shading is compared with a constant reference voltage to convert it to a multi-level signal, a correct multi-level information signal is not produced.

Optical compensation and electric compensation for the shading have been proposed. In the optical compensation, the illumination of the document sheet may be adjusted by rearranging a light source or disposing a filter or a mask so that a white scan signal train having a constant signal level is produced. This method needs a complex and large device and takes long time for adjustment and is hard to attain a sufficient effect.

The electrical compensation includes a way of controlling a gain of a video amplifier to produce a shading-free video signal and another way of effecting compensation in a signal processing step of converting an analog signal containing shading to a multi-level signal.

It has been proposed to store the shading in a memory and read it out in a scan cycle to compensate the shaded signal.

Japanese Patent Application No. 52-9761 a shading signal read out of a memory.

In a facsimile, the analog video signal is usually converted to a bi-level (digital) signal. In order to correctly convert a black information signal superimposed on a white scan analog video signal containing shading to a bi-level signal, a slice signal which varies in accordance with the shading may be used.

Japanese Patent Application No. 48-130508 (Laid-Open No. 50-b 81419) teaches to compensate a slice signal for discriminating a video signal by a shading signal read out of a read-only memory (ROM).

Co-pending U.S. Patent Application Ser. No. 151,982 by one of the inventors of the present application teaches to carry out shading compensation using a stored shading profile and a peak voltage of the scan signal held in a peak-hold circuit.

It has been desired to carry out the shading compensation with a high precision by a simple circuit configuration without requiring a high speed operation.

SUMMARY OF THE INVENTION

It is an object of the present invention to provide a simple signal processing system which can correctly convert an information bearing analog scan signal containing a nonuniform shading profile to a multi-level signal.

It has been found that the use of a slice signal which varies in accordance with the shading is effective in order to convert an analog signal superimposed on the nonuniform background (shading) to a multi-level signal with a high precision. To this end, it is desirable to store the shading in a memory and read it out in each scan cycle to produce a slice signal responding to the shading characteristic. In order to record the shading which may vary with time and is inherent to a device, a writable memory is used. From the standpoints of the stability for repetitive readout, economy, availability and compatibility with other circuit components, a semiconductor digital memory may be used.

A high speed, large capacity memory and high speed processing circuit components can store and reproduce any level and any form of shading but they are not desirable from a standpoint of stability and economy.

By processing the information signal representing the shading characteristic to obtain a shading signal suited to utilize a full capacity of a memory, shading compensation with a high precision is attained with a given capacity of memory. By normalizing the white scan signal train basically by a peak value thereof and storing it in the memory, the shading profile can be stored in the given capacity of memory with a high precision. In a reading operation, the normalized shading profile is denormalized basically by a current peak voltage of the scan signal trains so that an instantaneous shading characteristic including the voltage level can be reproduced with a high precision regardless of a variation in the background of a text.

In digital-to-analog conversion, the reproduction of a rising edge of the shading profile may need a high speed operation of the signal processing circuit components. By storing the initial value of the shading profile in a block in the memory and loading them to a counter simultaneously in the read operation, the rising edge of the shading characteristic can be reproduced with a high fidelity with relatively low speed components. This is particularly effective when an external memory is used with a serial access mode.

BRIEF DESCRIPTION OF THE DRAWINGS

FIG. 10 shows a time chart of signals for explaining the operation of the system shown in FIG. 9, and FIG. 11 shows a diagram of a shading characteristic for explaining an advantage of the system shown in FIG. 9.

DESCRIPTION OF THE PREFERRED EMBODIMENTS

For illustrative purpose, the present invention will now be explained with reference to a signal processing system in a facsimlile.

Figure 1:
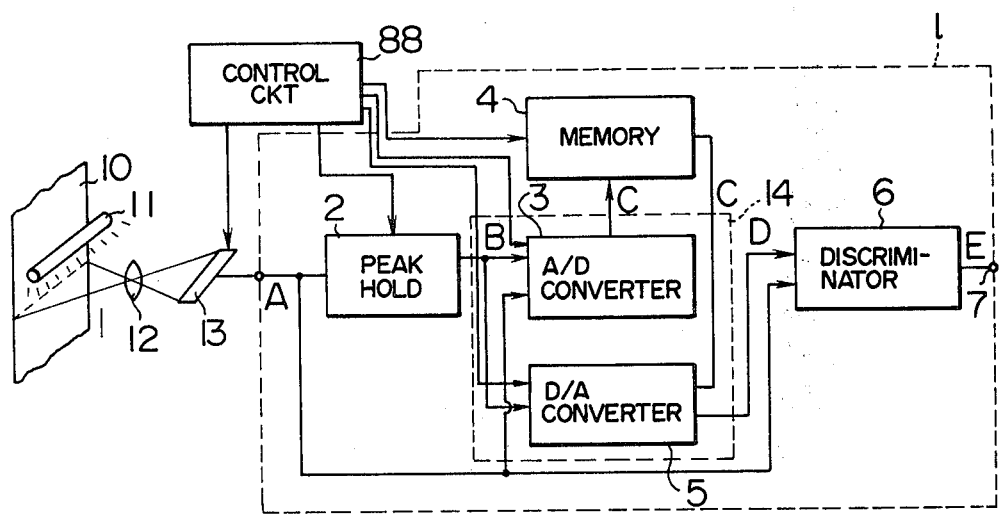
FIG. 1 is a block diagram showing a facsimile having a signal processing system in accordance with one embodiment of the present invention.

Referring to FIG. 1, a document 10 driven in a direction of an arrow by drivemeans (not shown) is illuminated by a lamp 11 and a scanning line area extending widthwise of the document (normal to the direction of drive) is imaged on a photo-sensitive plane of a photoelectric converter array 13 through a lens 12. The photo-electric converter array 13 may be a CCD line sensor which may comprise 2048 picture cells. Voltage signals produced in the respective picture cells of the photo-electric array 13 are taken out serially in the order of cell arrangement and applied to an analog video input terminal 1 as an analog video signal A. Such an analog video signal A usually includes 20-40% shading. Numeral 2 denotes a peak hold circuit which holds a peak value of the analog video signal A applied to the video input terminal 1 and produces an analog peak voltage B. An analog-to-digital converter 3 in a converter circuit 14 receives the analog video signal A for the scan of a white area (top of the document sheet) and the analog peak voltage B, and produces a digital coded shading profile signal C which is normalized by the analog peak voltage B and supplies the signal C to a memory 4, which stores the normalized shading profile signal C. The normalization is carried out by scaling the voltage of the analog video signal A using the peak voltage B as a reference. Any unit and any scale may be selected. The peak hold circuit 2 produces an instantaneous peak voltage Vp which follows a change in the background of the document sheet. When image information is to be processed, a digital-to-analog converter 5 in the converter circuit 14 receives the normalized shading profile signal C which is read out of the memory and a current analog peak voltage B produced by the peak hold circuit 2 and produces an analog reference voltage D corresponding to white or plain background at that time. By appropriately dividing the analog reference voltage D, a shading-compensated slice signal D' is produced. Numeral 6 denotes a discrimination circuit which compares the analog video signal A carrying the image information with the slice signal D' derived by dividing the reference voltage D to produce a multi-level information signal E at an output terminal 7. The operations of the photo-electric converter array 13, the memory 4 and the converter 14 including the analog-to-digital converter 3 and the digital-to-analog converter 5 are controlled by timing signals from a control circuit 88. The circuit elements in a broken line 1 may be integrated in one chip LSI.

Figure 2:
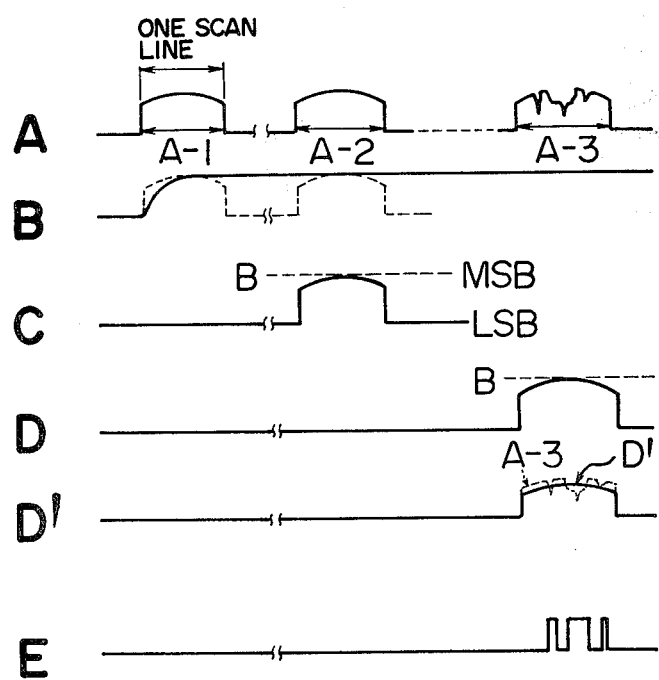
FIG. 2 shows a time chart of signals for explaining the operation of the system shown in FIG. 1, FIGS. 3 to 7 show examples of circuit blocks used in the system shown in FIG. 1.

Referring to a time chart of FIG. 2, the operation of the circuit is now explained.

The analog information signal A which is produced by repetitively and photo-electrically scanning the document sheet includes white scan signal trains A-1 and A-2 and information scan signal trains A-3, —The white scan signal train A-1 is applied to the peak hold circuit 2 which holds a peak value thereof and produces a peak hold voltage B at the output. The next incoming white scan signal train A-2 is normalized by the peak hold voltage B for each picture cell and digitized to produce a shading profile signal C for all picture elements of a scanning line. The normalized digitization may be carried out by digitizing the white scan signal train A-2 for all the picture elements while putting the peak hold voltage to a most significant digit MSB (a maximum value in digital representation) and a zero volt signal to a least significant digit LSB (a minimum value in digital representation). The digitazation may be carried out by dividing the white scan signal train A-2 by time axis and sampling the divided signals independently, or by sequentially comparing the current picture cell value with the previous picture cell value. The digital signals C are sequentially stored in corresponding addresses of the memory 4. In this manner, the normalized digitization and the storage (storage of the shading profile) of the white scan signal train (e.g. plain background of the document sheet) are completed.

After the shading profile has been stored, the signal processing system proceeds to the process of converting the analog scan signal train to a multi-level signal. This shift of operation takes place in response to the detection of a predetermined time after the initiation of the photo-electric conversion of the document sheet or to that of a predetermined number of scanning lines. In the multi-level conversion operation, the analog scan signal train A-3 carrying the image information is applied to the information input terminal 1. In synchronism therewith, the shading profile digital signals stored at the addresses corresponding to the picture cell positions in the memory 4 are read out and applied to the digital-to-analog converter 5. The digital-to-analog converter 5 also receives the peakhold voltage B and produces the reference voltage D having the possible maximum value at the peak-hold voltage B. By constructing the peak hold circuit 2 such that it always holds a peak value of the current analog scan signal train A, it is posible to produce the reference voltage D adapted to the analog scan signal train A-3 even when the plain background of the document sheet varies. The reference voltage D thus produced is applied to the discrimination circuit 6 which produces a slice voltage D', which in turn is compared with the analog scan signal train A-3 to produce a bi-level information signal E. When a plurality of slice voltages are used to produce a multi-level signal, gray information can be reproduced. By changing the slice voltage, a black-white discrimination level can be varied.

Figure 3:
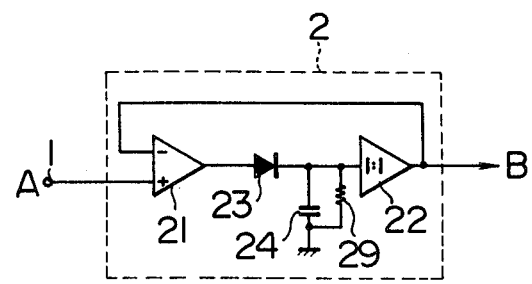
Figure 4:
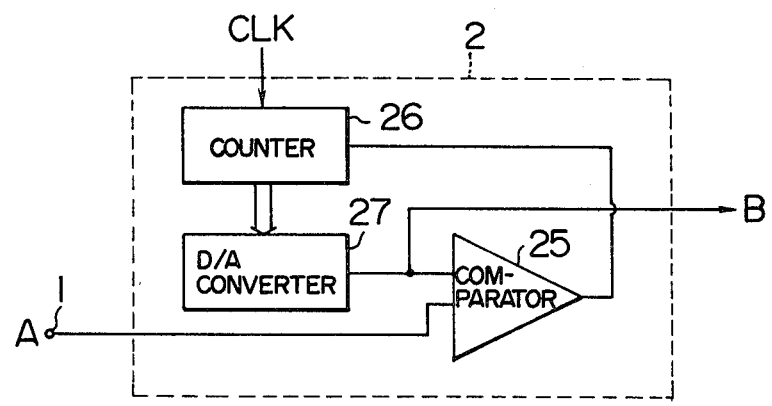

Electrical circuits are now explained in detail. FIGS. 3 and 4 show examples of the peak hold circuit 2. FIG. 3 shows an analog processing circuit and FIG. 4 shows a digital processing circuit. In FIG. 3, numeral 21 denotes an operational amplifier, numeral 22 denotes a voltage follower, numeral 23 denotes a diode, numeral 24 denotes a voltage holding capacitor and numeral 29 denotes a resistor determining the discharge time constant. The analog scan signal train A is supplied to the capacitor 24 through the operational amplifier 21 and the diode 23 and a peak value thereof is held in the capacitor 24. The charge stored in the capacitor 24 is gradually discharged through the resistor 29 to follow the current peak value of the analog scan signal train. The peak value is applied to the voltage follower 22 which produces the peak hold voltage B. In order to fix the peak hold voltage B, the resistor 29 may be disconnected. The resistor 29 may be substituted by a potentiometer to adjust the time constant or it may be substituted by a controlled switch to allow resetting of the peak hold voltage B. In FIG. 4, numeral 25 denotes a comparator, numeral 26 denotes an address counter and numeral 27 denotes a digital-to-analog converter. The comparator 25 receives the analog scan signal train A from the information input terminal 1 and compares it with an output of the digital-to-analog converter 27 (peak hold voltage B). When the analog scan signal train A is larger than the peak hold voltage B, it produces a control output which renders the address counter 26 to count up clock pulses CP. The count in the address counter 26 is converted to an analog signal by the digital-to-analog converter 27, which analog signal constitutes the voltage B. Thus, the voltage B provides a peak value of the applied analog scan signal train A. When the peak hold voltage B is desired to follow the change of the background of the document sheet, an up/down counter may be used as the address counter 26 and the count thereof may be periodically decremented, as taught in Japanese Patent Application No. 55-60571 filed on May 9, 1980 (corresponding to U.S. Ser. No. 260,122, now U.S. Pat. No. 4,367,457 hold operation for the analog scan signal train A described above starts immediately after the initiation of the photo-electric scan of the documet sheet and is cleared when the scan has been completed. The digital-to-analog converter 27 may be constructed in a similar manner as the digital-to-analog converter 5 which will be explained later.

Figure 5:
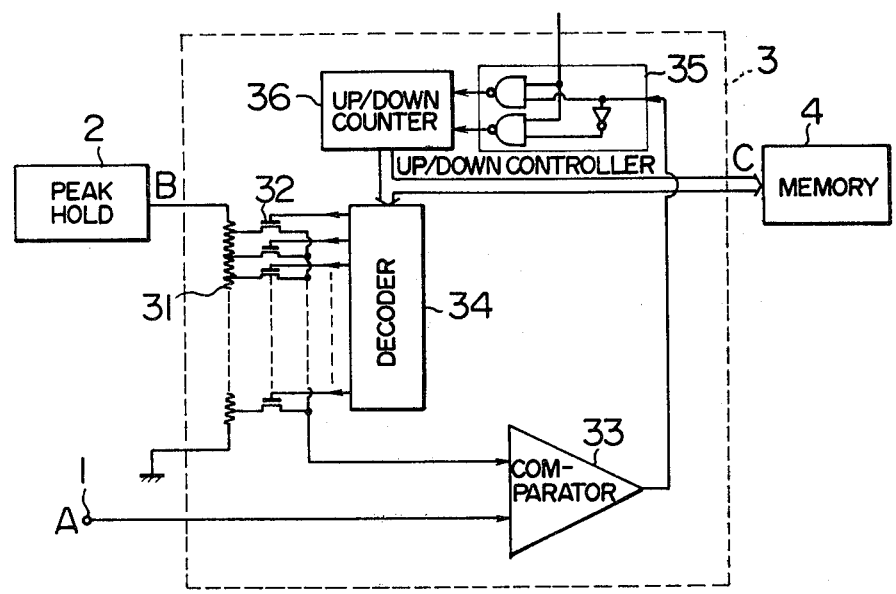

FIG. 5 shows an example of the analog-to-digital converter 3 used to store the shading profile. Numeral 31 denotes a voltage dividing resistor which is connected to the output terminal of the peak hold circuit 2 described above. Numeral 32 denotes semiconductor gate switches which are connected between voltage dividing terminals of the voltage dividing resistor 31 and a reference input terminal of a comparator 33. The gate switches 32 are controlled by outputs of a decoder 34 and a voltage determined by the selected switch is supplied to the reference voltage terminal of the comparator 33. The comparator 33 compares the analog scan signal train A with the output voltage from the gate switches 32 to produce a difference signal, which is then fed back to a counter 36 through an up/down control circuit 35 so that the inputs to the comparator 33 are made equal. More particularly, when the analog scan signal train A is larger than the output voltage of the gate switches 32, the counter 36 counts up the clock signals, and when the former is smaller than the latter, the counter 36 counts down the clock signals. The output from the counter 36 provides the digital signal C which corresponds to the shading profile normalized by the peak hold voltage B. The digital signal C is stored in the memory4 at addresses corresponding to the picture cell position.

Figure 6:
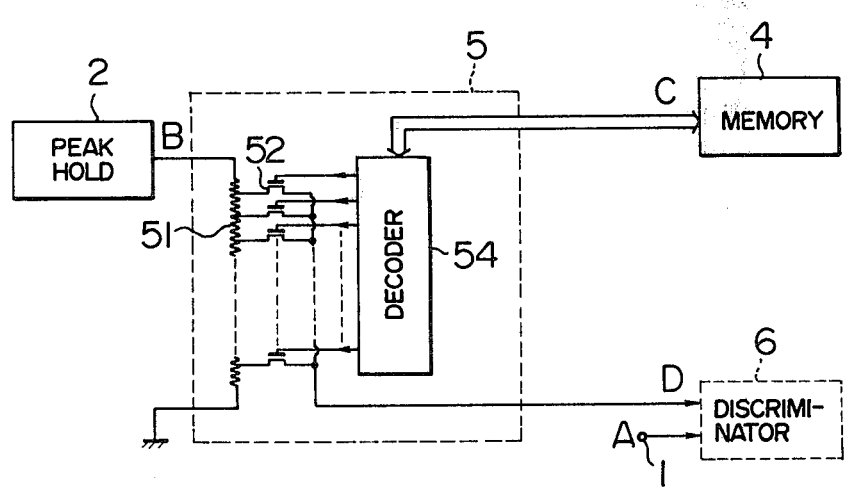

FIG. 6 shows an example of the digital-to-analog converter 5. Numeral 51 denotes a voltage dividing resistor which is connected to the output terminal of the peak hold circuit 2 described above. Numeral 52 denotes semiconductor gate switches which are connected between voltage dividing terminals of the voltage dividing resistor 51 and the discriminator circuit 6. A decoder 54 receives the digital signal C read out of the memory 4 and controls the gate switches 52. Thus, by denormalizing the shading profile read out of the memory 4 by the peak-hold voltage B, in accordance with the picture cell position of the photo-electric scan, the reference voltage D which reflects the shading characteristic of the scan line is produced.

Figure 7:
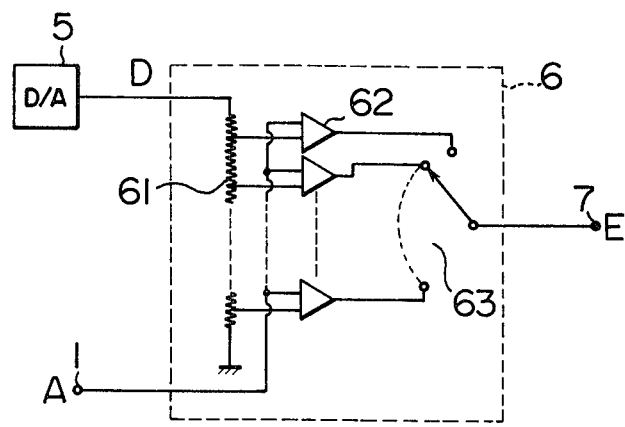

FIG. 7 shows an example of the discriminator circuit 6. Numeral 61 denotes a voltage dividing resistor which is connected to the output terminal of the digital-to-analog converter 5 and to which the reference voltage D is applied. Numeral 62 denotes comparators which receive respective slice voltages from respective voltage dividing terminals of the voltage dividing resistor. Each comparator 62 compares the analog scan signal train A with the slice voltage to produce bi-level signal. Numeral 63 denotes a selection switch which selects any one of the outputs from the comparators 62 and supplies the selected output to the output terminal 7 as the bi-level information signal E.

In the embodiments described above, the precision in converting the analog scan signal train to the multi-level signal train depends on the precision of the peak hold circuit to reproduce the peak value, and the precision of conversion in the analog-to-digital converter 3 and the digital-to-analog converter 5 of the converter circuit 14. When the digital peak hold circuit including the digital-to-analog converter as shown in FIG. 4, is used, the entire conversion precision depends on the conversion precisions of the analog-to-digital converter and the digital-to-analog converter. For example, each converter may handles 7-bit (128-step) digital signals and corresponding analog voltages. Those analog voltage steps are preferably distributed effectively in a voltage range of the voltage signals to be handled from a standpoint of precision. The voltage dividing resistors 31 and 51 of the converters 3 and 5 must be divided at the same step in order to allow the reproduction of the signal with high fidelity. The voltage division in the converter 27 may differ from the voltage divisions in the converters 3 and 5.

In the digital-to-analog or analog-to-digital converter, when the voltage is linearly divided, the precision for small voltage signals is degraded. For example, a precision of 1% is presented to a 1-volt voltage signal with a 10 mV step but a precision of 2% is presented to a 500 mV voltage signal. Accordingly, the voltage range is preferably divided by a geometric progression (exponentially) in order to assure a uniformly high precision irrespective of the magnitude of the voltage signal.

Assume that the voltage dividing terminals are at the points of resistances $\gamma_0, \gamma_1, \gamma_2, \ldots \gamma_m$ in the voltage dividing resistor string and voltages $V_0, V_1, V_2 \ldots V_m$ are produced thereat. A voltage difference between adjacent voltage sections is represented by $\Delta V_n = V_n - V_{n-1}$ ($n = 1, \ldots$ m). An error $\epsilon_n$ may be represented by $\epsilon_n = \Delta V_n / V_n = (V_n - V_{n-1})/V_n$ ($n = 1, \ldots$ m). When the error is constant, $\epsilon_i = \epsilon_o$ (constant) and $V_n = \Delta V_n / \epsilon_o = (V_n - V_{n-1})/\epsilon_o$. Accordingly, $V_n = V_{n-1}/(1 - \epsilon_o)$ and $V_n = \{1/(1-\epsilon_o)\}^n V_o$. When a current i flows through the resistor string, $V_n = i\gamma_n$ and $\gamma_n = \gamma_{n-1}/(1-\epsilon_o)$. Thus, when the resistor string is divided by the geometrical progression, the error $\epsilon$ is constant. Since the voltage dividing terminals are not required in the voltage range which is not used, the resistances $\gamma_o$, and $\gamma_m$ may be determined in accordance with the minimum and the maximum of the voltage range used.

While the input to the memory 4 in FIG. 5 is shown as parallel output from the counter, it is not restrictive. When an off-chip memory is used, the parallel signal transfer causes a pin-neck. In this case, the output of the comparator 33 may be supplied as a serial signal as will be explained later. In FIG. 6, the output from the memory may be supplied as a serial signal and applied to the decoder through a serial-parallel converter. When all of the circuit components in the block surrounded by the broken line l in FIG. 1 are integrated in one chip LSI, the parallel signal transfer does not raise a problem and the input and output of the memory may be parallel signals as shown. While the illustrated embodiment uses the resistor strings having the voltage dividing terminals, other voltage dividing resistor networks such as resistor matrix or resistor tree may be used.

While the illustrated embodiment uses the line sensor to effect the photo-electric scan, a single sensor and deflection mirror may be used or a matrix sensor may be used to effect the photo-electric conversion of a plurality of scan lines simultaneously.

Figure 8:
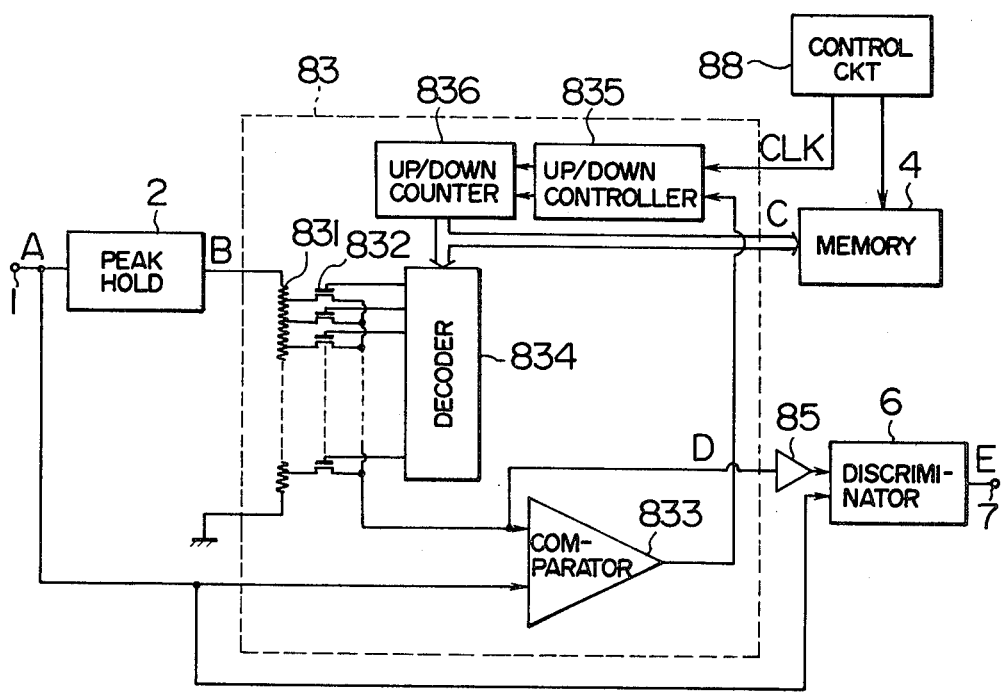
FIG. 8 is a block diagram showing a signal processing system in accordance with another embodiment of the presnet invention.

FIG. 8 shows a block diagram of another embodiment in which components of the analog-to-digital converter and the digital-to-analog converter are partially shared. The information input terminal 1 and the peak hold circuit 2 are similar to those shown in the previous embodiment. Numeral 83 denotes a signal converter circuit which has the functions of the analog-to-digital converter 3 and the digital-to-analog converter 5 of the previous embodiment but the construction is substantially similar as the analog-to-digital converter shown in FIG. 5. Numeral 831 denotes a voltage dividing resistor, 832 denotes semiconductor gate switches, 833 denotes a comparator, 834 denotes a decoder, 835 denotes an up/down control circuit and 836 denotes a counter. Numeral 6 denotes a discriminator circuit which is similar to that shown in FIG. 7. The input circuit of the discriminator 6 is connected in common to the through a buffer circuit 85 and a bi-level information signal E is produced at the output terminal 7. Numeral 4 denotes the memory an input/output circuit of which is connected to an output terminal of the counter 836. Numeral 88 denotes a control circuit which supplies timing pulses to the up/down controller 835 and the memory 4 so that the signal converter circuit 83 selectively operates as the analog-to-digital converter or the digital-to-analog converter.

The operation of this embodiment is now explained. In an initial stage of the photo-electric conversion scan, the signal converter circuit 83 is controlled by the control circuit 88 such that it operates as the analog-to-digital converter to store the shading profile. The up/down controller 835 supplies an increment or decrement signal to the counter 836 depending on the output from the comparator 833, and the memory 4 assumes a write state. As shown in FIG. 2 the peak hold circuit 2 holds a peak value of the white scan signal train A-1 and compares the subsequently supplied white scan signal train A-2 with the peak hold voltage B to produce the normalized shading profile digital signal C, which is then stored in the memory 4. The storage operation is identical to that carried out in the analog-to-digital converter shown in FIG. 5. After the shading profile has been stored, the control circuit 88 renders the up/down controller 835 to assume a rest state and renders the memory 4 to assume a read state. The digital signal C is read out of the memory 4 from the address corresponding to the picture cell position of the scan signal train A-3 applied to the analog information input terminal 1. The semiconductor gate switches 832 are controlled to produce the reference voltage denormalized by the peak hold voltage B. This operation is similar to that of the digital-to-analog converter shown in FIG. 6. The analog scan signal train A-3 and the reference voltage D are applied to the discriminator circuit 6 which produces the bi-level information signal E. The operation of the discriminator circuit 6 is identical to that shown in FIG. 7.

Figure 9:
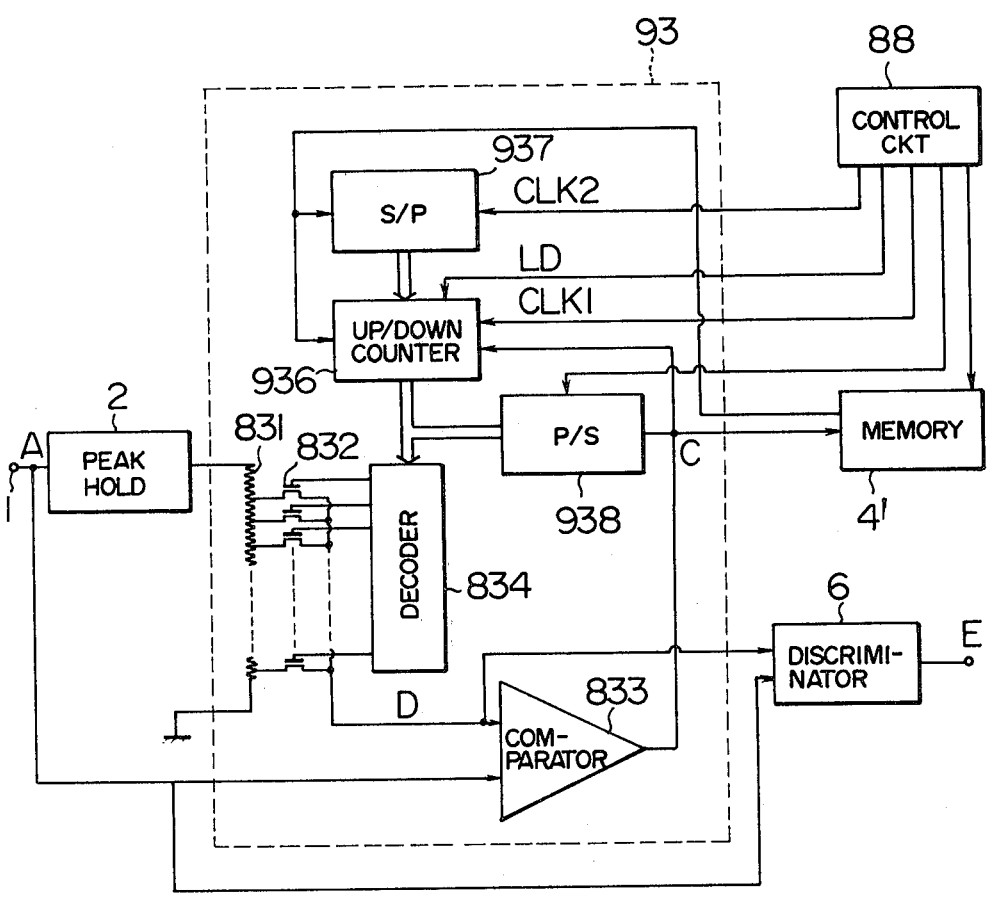
FIG. 9 is a block diagram showing a signal processing system in accordance with a further embodiment of the present invention.

FIG. 9 shows an embodiment in which the input and the output of the memory are serial signals and a high precision signal processing is attained with relatively low speed circuit components. The like numerals as in the previous figures denote the like elements.

An up/down counter 936 includes an up/down controller and it counts up or down clock pulses CLK1 under the control of the output of the comparator 833. When a load signal LD is applied thereto, it loads a parallel output of a serial-parallel (S/P) converter 937. The parallel output of the up/down counter 936 is converted to a serial signal by a parallel-serial (P/S) converter 938 and the serial signal is stored in a memory 4'. The serial output of the memory 4' is either supplied directly to the up/down counter 936 or converted to a parallel signal by the serial-parallel converter 937 and then the parallel signal is supplied to the up/down counter 936.

Referring to FIGS. 10 and 11, the operations of storing the shading profile and producing the slice signal are explained. An initial value Vi of an analog video signal train A shown in FIG. 10 is detected and stored. During the detection period, the clock signals CLK1 are counted up by the up/down counter 936 throughout each initial period of the analog video signal train A which is repetitively applied. As a result, the output voltage D of the semiconductor gate switch 832 selected by the decoder 834, or the output of the converter 93 rises. The count-up operation of the up/down counter 936 is controlled by the output of the comparator 833 and it continues until the initial value Vi is reached by the output voltage D of the gate 832, when the count-up operation is stopped. The count in the up/down counter 936 represents the digital value of the initial value Vi normalized by the peak voltage held in the peak hold circuit 2. By applying a control clock CLK3 to the parallel-serial converter 938, this value is stored in the memory 4' as a serial signal. After the initial value Vi has been detected, the clock signals CLK1 are controlled to be supplied continuously during each scan period. The incoming analog video signal train A is compared with the output voltage D of the gate 832 by the comparator 833, which produces an output to control the up or down mode of the up/down counter 936. In this manner, the output voltage D of the gate 832 follows the waveform of the analog video signal train A. The serial output signal of the comparator 833 which represents the change in the content of the up/down counter 936 is stored as the variation of the shading profile relative to the preceding value. Thus, the initial value of the shading profile and the subsequent changes thereof are separately stored in the memory 4' through separate paths. The storage operation of the shading profile has thus been explained. For example, for a line sensor of 2048 bits, the shading profile therefrom can be stored in a memory of 2048 or 1024 bits.

The reproduction of the slice signal is now explained. The normalized digital value of the initial value Vi stored in the memory 4' is read out to the serial-parallel converter 937 by supplying a clock CLK2 to the serial-parallel converter 937. Then, the load signal LD is supplied to the up/down counter 936 to load the parallel output of the serial-parallel converter 937 (normalized digital value of the initial value Vi) to the counter 936. As a result, the decoder 834 selects one of the gate switches 832 so that the initial value of the shading characteristic which is denormalized by the current peak voltage is produced at the output of the gate 832. Then, drive clocks CLK1 are supplied to the up/down counter 936 and the changes of the shading profile stored in the memory 4'0 is read out to control the up and down modes of the up/down counter 936. Thus, the gate 832 or the digital-to-analog converter 93 produces the reference voltage D which approximates the shading characteristics of the instantaneous scan line. The output voltage D is appropriately divided in the discriminator circuit 6 to produce the slice signal D'.

In such a relatively low speed signal processing system, if the parallel loading of the initial value is not carried out, the reproduced waveform does not represent a correct shading characteristic during a time period $t_0$ during which the output voltage D of the digital-to-analog converter 93 rises, as shown in FIG. 11. For example, when the digital signal comprises seven bits (128 steps) and the output voltage D rises step by step at a 1 MHz clock, a time period of 128 microseconds is needed for the output voltage D to rise to the peak value. When one scan line comprises 2048 bits, the output voltage D cannot correctly reproduce the shading characteristic for the heading portion of 128/2048 of each scan line. As a matter of course, the period $t_0$ is short enough to be neglected if the high speed signal processing system is used although the high speed signal processing system is expensive. However, since the initial value Vi is loaded parallelly to the up/down counter 71 upon the reception of the analog video signal train A, the output voltage D of the digital-to-analog converter 93 immediately follows the shading characteristic so that the correctness of the slice signal is enhanced.

While specific embodiments have been described and illlustrated, it should be understood that various alternations and modifications of the embodiments can be made without departing from the spirits of the present invention.

What is claimed is:

1. A scan signal processing system for converting an analog scan signal into a multi-level signal, the analog scan signal including a shading profile substantially common to each scan line, comprising:
   input means adapted for receiving said analog scan signal;
   peak hold means connected to said input means, for detecting a peak of the analog scan signal and holding a corresponding peak value;
   digital memory means for storing and supplying digital data;
   converter means connected to said input means, said peak hold means, and said memory for normalizing said analog scan signal on a basis of said peak value, converting the normalized signal into a digital signal and supplying the digital signal to said memory means, and also for denormalizing the digital signal supplied from said memory means on the basis of said peak value to supply the analog reference signal; and
   discriminator means connected to said input means and said converter means for receiving said analog scan signal and said analog reference signal, discriminating the analog scan signal based on the analog reference signal and producing a multi-level signal;
   the memory means and the converter means being adapted to be controlled to store a shading profile in the memory means in an initial scan period and producing shading characteristic using the stored shading profile and the peak value in a following scan period.

2. The system of claim 1, wherein:
   said converter means including a voltage divider having an end terminal connected to said peak hold means, the other end terminal grounded and a voltage dividing terminal for providing a divided output voltage of said peak value, the divided output voltage constituting said analog reference signal.

3. The system of claim 2, wherein:
   said converter means further includes gate means connected to said voltage divider for selecting the ratio of said divided output voltage to said peak value.

4. The system of claim 3, wherein:
   said converter means further includes decoder means for controlling said gate means by a digital signal coded in a predetermined manner.

5. The system of claim 4, wherein:
   said decoder is connected to said memory means for receiving digital signal stored therein.

6. The system of claim 4, wherein:
   said converter means further includes a first comparator connected to said input means and said voltage dividing terminal of the voltage divider for comparing the analog scan signal and said divided output voltage, and an up/down counter connected to said first comparator and said decoder for receiving an output of said first comparator and supplying a counter output to said decoder, thereby the converter means being capable of changing the content of said counter to follow an instantaneous voltage of said analog scan signal.

7. The system of claim 6, wherein:

said memory means is connected to said first comparator and said counter for storing the output of the first comparator and supplying a stored information to said counter.

8. The system of claim 7, wherein:
said converter means further includes a serial-to-prallel converter connected between said memory means and said counter, thereby is capable of loading a serial output of said memory means parallelly into said counter.

9. The system of claim 7 or 8, wherein:
said converter means further includes a parallel-to-serial converter connected between said counter and said memory means, thereby is capable of loading a parallel output of said counter serially into said memory means.

10. The system of claim 9, wherein:
said memory means and said converter means are formed in different semiconductor chips.

11. The system of claim 6, wherein:
said memory means is connected to said up/down counter and said decoder, thereby capable of receiving an output of said up/down counter and supplying stored information to said decoder.

12. The system of claim 11, wherein:
said memory receives a parallel signal from said counter and supplies a parallel signal to said decoder.

13. The system of claim 1, wherein:
said discriminator means includes another voltage divider for dividing said analog reference signal and second comparator for comparing said analog scan signal with said divided reference signal and generating said multi-level signal.

14. The system of claim 1, wherein:
said memory means including a first part for storing the initial value of said shading profile and a second part for storing the variation of said shading profile relative to a preceding value.

15. The system of claim 1, wherein:
said peak hold means includes another counter for counting a clock signal upon reception of a control signal, a digital-to-analog converter connected to said another counter for receiving the output of said another counter and generating a corresponding voltage signal and a third comparator connected to said digital-to-analog converter and said input means for receiving signals therefrom and generating said control signal when the analog scan signal is larger than said corresponding voltage signal.

* * * * *